Oct. 21, 1941.          C. C. SEVERIN          2,259,838
                        COLLAPSIBLE STAIRS
                        Filed June 6, 1940

INVENTOR.
C. C. Severin
BY Emil F. Lange
ATTORNEY.

Patented Oct. 21, 1941　　　　　　　　　　　　　　　　　2,259,838

UNITED STATES PATENT OFFICE 2,259,838

COLLAPSIBLE STAIRS

Christian C. Severin, Unadilla, Nebr.

Application June 6, 1940, Serial No. 339,139

10 Claims. (Cl. 280—166)

My invention relates to collapsible stairs, the present invention being designed for application and use on trucks and other high vehicles.

One of the objects of the invention is the provision of a collapsible stairway which may be secured at either the rear or the side of the truck and which may be collapsed or folded under the truck when not in use.

Another object is the provision of collapsible stairs which may be folded or collapsed under the floor of the truck to entirely escape ridges or other similar obstructions in the road.

Especially is it my object to provide a device which will enable one to climb onto high trucks with ease, the device being so formed that it may be folded as to avoid obstructions which may be on the road and so folded as to be out of the way of other vehicles.

Having in view these objects and others which will be pointed out in the following description, I will now refer to the drawing, in which Figure 1 is an elevational view of my collapsible stairs showing the operative position of the stairs.

Figure 1:
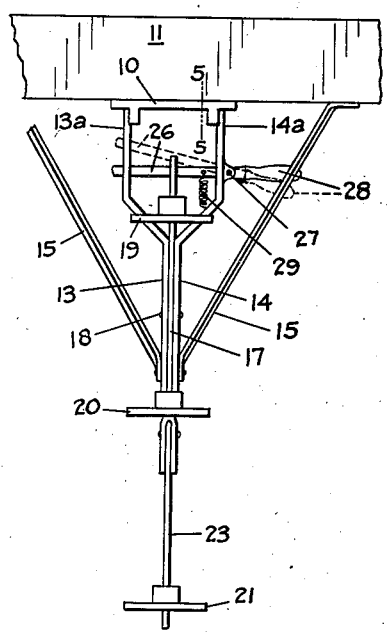

As best shown in Figure 1, the bracket 10 is rigidly secured to the sill 11 of a truck or the like either at the side or rear as governed by the form of the truck body. Depending from the bracket 10 is a support 12 which consists of two spaced apart members 13 and 14 which are divergent in the upper portions 13a and 14a which are rigidly secured to the bracket 10. For increasing the rigidity of the connections between the support 12 and the bracket 10, braces 15 extend from the lower extremity of the support 12 to the floor 16 of the truck.

Figure 3:
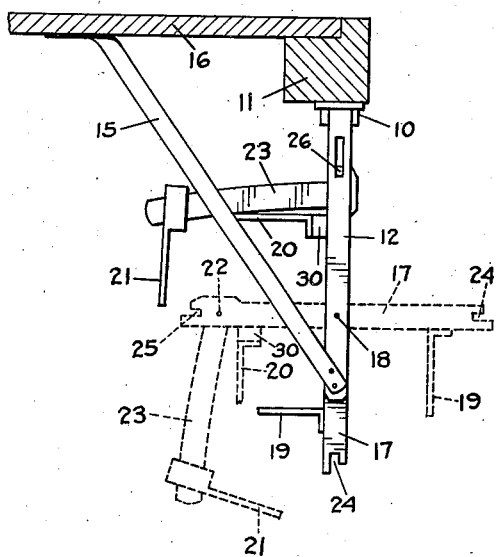
Figure 3 is a view similar to Figure 2 but showing the stairs in their folded position, the steps being also shown in dotted lines in an intermediate position.

Between the members 13 and 14 is a lever 17 which is pivoted at 18 to the support 12, the form of the lever 17 being best shown in dotted lines in Figure 3.

The two steps 19 and 20 are rigidly secured to the lever 17 to project laterally therefrom and in the same direction. In the operative position of the folding stairs, the two steps 19 and 20 project outwardly or rearwardly from the truck as shown in Figure 2 but it is obvious that if the lever 17 is swung through an arc of two quadrants about its pivot 18, the two steps will be under the floor of the truck as shown in full lines in Figure 3.

Figure 2:
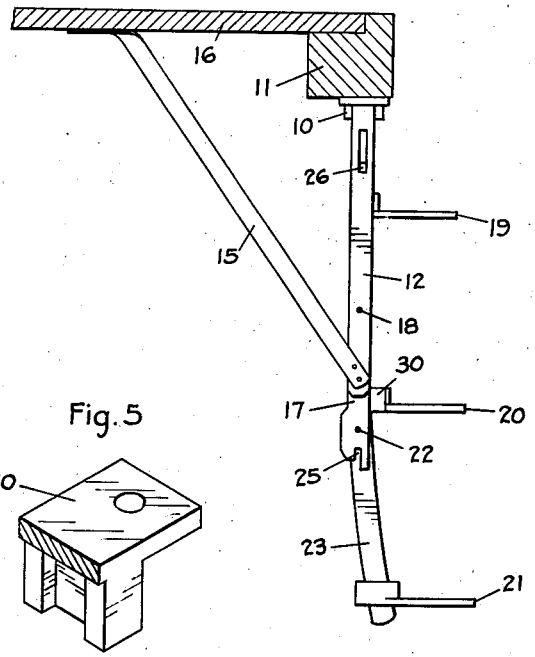
Figure 2 is an elevational view of the same collapsible stairs in operative position and as viewed from the side of Figure 1.
Figure 5:
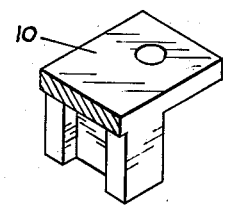
Figure 5 is a perspective sectional view on the line 5—5 of Figure 1.
Figure 4:
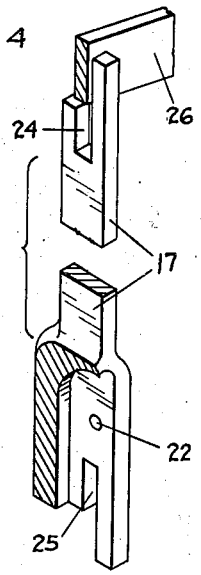
Figure 4 is a view in perspective of the end portions of a lever which functions in the folding and unfolding operation of the stairs.

While the parts are in the Figure 2 position and ready for use as a ladder or stairway, the step 20 is substantially midway between the ground and the top of the ladder or stairway. This necessitates another step 21 positioned midway between the step 20 and the ground. The lower portion of the lever 17 is provided with a socket as shown in Figure 4 and with a pivot aperture 22 for the pivotal connection thereto of an arm 23 which supports the step 21. The arm 23 thus has free swinging but limited pivotal movement in one direction only to facilitate the folding of the arm 23 and step 21 into the full line position of Figure 3 when the lever 17 is swung into the folded position of the ladder or stairway.

Means are provided for latching the ladder or stairway into either of its two positions. For this purpose, like notches 24 and 25 are provided in opposite extremities of the lever 17, the notches being partly open on one side as best shown in Figure 4. In the path of these notches, which are equidistant from the pivot 18, is a latch bar 26 which is pivoted at 27 and which terminates in the handle 28. In either the operative or inoperative position of the ladder or stairway, the device is latched and it must be released by depressing the handle 28 before it may be swung from one position to the other. The latch is automatic in either position of the ladder or stairway since the latch bar 26 is urged to its latching position by the spring 29.

The device as shown is a stairway rather than a ladder. This is accomplished by employing stair treads instead of ladder rungs and by arranging the treads progressively so that the climber moves not only upwardly but also in a forwardly inclined direction. The treads 19, 20 and 21 are similar in form to support the ball of the foot of the climber. The tread 19 is secured directly to the lever 17 but the tread 20 is spaced from the lever 17 by a block 30 between the tread and the lever. This positions the tread 19 above and slightly forward of the tread 20. The tread 21 is positioned below and slightly rearward of the tread 20, this being accomplished by the curved form of the arm 23 which supports the tread 21 as best shown in Figure 2.

Having thus described my invention in such full, clear, and exact terms that its construction and operation will be readily understood by others skilled in the art to which it pertains, what I claim as new and desire to secure by Letters Patent of the United States is:

1. Collapsible stairs including a support for attachment underneath and at one edge of the floor of a truck or the like to depend therefrom, a lever pivotally secured at the midpoint thereof to said support, a pair of stair treads secured to project from said lever near the opposite extremities thereof, an arm swingingly secured to said lever and having secured thereto a third stair tread, and means for latching said lever in either of two vertical positions on said support.

2. Collapsible stairs including a support for attachment underneath and at one edge of the floor of a vehicle or the like to depend therefrom, a lever pivotally secured at the midpoint thereof to said support, a pair of stair treads secured to project from said lever near the opposite extremities thereof, an arm swingingly connected to said lever and having secured thereto a third stair tread, said three stair treads in the operative position being arranged in stair-like form by the progressive decrease of the distances of said stair treads from the vertical wall of the truck, and means for latching said lever in either of two vertical positions on said support.

3. Collapsible stairs including a support for attachment underneath and at one edge of the floor of a vehicle to depend therefrom, a lever pivotally secured at the midpoint thereof to said support, an arm swingingly secured to said lever, a stair tread secured to said lever, a further stair tread secured to said arm, and a latch adapted to engage either end of said lever to latch said lever in either of two oppositely disposed positions, in one of which the arm depends from the lever and the stair treads extend outwardly from said support and in the other of which the arm is folded with respect to said lever and said stair tread carried by said lever extends inwardly of said support.

4. Collapsible stairs including a support for attachment underneath and at one edge of the floor of a vehicle to depend therefrom, a lever pivotally secured at the midpoint thereof to said support, an arm swingingly secured to said lever, a pair of stair treads secured to said lever near the opposite ends thereof, a further stair tread secured to said arm, and a latch adapted to engage either end of said lever to latch said lever in either of two oppositely disposed positions, in one of which the arm depends from the lever and the stair treads extend outwardly from said support and in the other of which the arm is folded with respect to said lever and said stair treads carried by said lever extend inwardly of said support.

5. Collapsible stairs including a support for attachment underneath and at one edge of the floor of a vehicle to depend therefrom, a lever pivotally secured at an intermediate point thereof to said support, an arm swingingly secured to said lever, a stair tread secured to said lever, a further stair tread secured to said arm, a latch for latching said lever in either of two oppositely disposed positions, in one of which the arm depends from the lever and the stair treads extend outwardly from said support and in the other of which the arm is folded with respect to said lever and said stair tread carried by said lever extends inwardly of said support, and means to limit the swinging movement between said arm and said lever.

6. Collapsible stairs including a support for attachment underneath and at one edge of the floor of a vehicle to depend therefrom, a lever pivotally secured at an intermediate point thereof to said support, an arm swingingly secured to said lever, a pair of stair treads secured to said lever near the opposite ends thereof, a further stair tread secured to said arm, and a latch for latching said lever in either of two oppositely disposed positions, in one of which the arm depends from the lever and the stair treads extend outwardly from said support and in the other of which the arm is folded with respect to said lever and said stair treads carried by said lever extend inwardly of said support, and a stop carried by said lever for limiting the movement of the arm in one direction, one of said stair treads carried by said lever being effective to limit the movement of the arm in the other direction.

7. Collapsible stairs including a support for attachment underneath and at one edge of the floor of a vehicle or the like to depend therefrom, a lever pivotally secured at an intermediate point thereof to said support, a pair of stair treads secured to project from one side of said lever near the opposite extremities thereof, an arm swingingly secured to said lever and having secured thereto a third stair tread, and means for latching said lever in either of two opposite disposed positions on said support in one of which the treads project outwardly from said support and in the other of which the treads project inwardly from said support.

8. Collapsible stairs including a support for attachment underneath and at one edge of the floor of a truck or the like to depend therefrom, a lever pivotally secured at the midpoint thereof to said support, a pair of steps secured to project from said lever near the opposite extremities thereof, an arm swingingly secured to said lever and having secured thereto a third step, and means for latching said lever in either of two vertical positions on said support.

9. Collapsible stairs including a support for attachment underneath and at one edge of the floor of a vehicle to depend therefrom, said support comprising two spaced bars, means at the upper ends of said bars for attachment to said vehicle floor, and a pair of upwardly diverging bracket members having their lower ends connected to said spaced bars and their upper ends adapted to be secured to said vehicle floor at points inwardly of the points at which said spaced bars are secured; a lever disposed between said spaced bars of said support and pivotally secured thereto at a point intermediate the length of said lever; stair treads secured to said lever on one side and near the opposite ends thereof; and latching means carried by said spaced bars for latching said lever in either of two oppositely disposed positions in one of which the stair treads extend outwardly from said support and in the other of which the treads extend inwardly of said support.

10. Collapsible stairs including a support for attachment underneath and at one edge of the floor of a vehicle to depend therefrom, said support comprising two spaced bars, means at the upper ends of said bars for attachment to said vehicle floor, and a pair of upwardly diverging bracket members having their lower ends connected to said spaced bars and their upper ends adapted to be secured to said vehicle floor at points inwardly of the points at which said spaced bars are secured; a lever disposed between said spaced bars of said support and pivotally secured thereto at the midpoint thereof of said lever; stair treads secured to said lever on one side and near the opposite ends thereof; and a latch extending between said bars and adapted to engage either end of said lever for latching said lever in either of two oppositely disposed positions in one of which the stair treads extend outwardly from said support and in the other of which the treads extend inwardly of said support.

CHRISTIAN C. SEVERIN.